(12) United States Patent
Takahashi

(10) Patent No.: US 9,969,168 B2
(45) Date of Patent: May 15, 2018

(54) RECORDING APPARATUS, RECORDING SYSTEM, AND MAINTENANCE METHOD FOR RECORDING APPARATUS

(71) Applicant: SEIKO EPSON CORPORATION, Tokyo (JP)

(72) Inventor: Noriyuki Takahashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/448,359

(22) Filed: Mar. 2, 2017

(65) Prior Publication Data

US 2017/0253042 A1   Sep. 7, 2017

(30) Foreign Application Priority Data

Mar. 3, 2016   (JP) ................. 2016-040780

(51) Int. Cl.
  *B41J 2/045*  (2006.01)
  *B41J 2/165*  (2006.01)
  *H04N 1/00*   (2006.01)

(52) U.S. Cl.
  CPC .......... *B41J 2/165* (2013.01); *B41J 2/04573* (2013.01); *B41J 2/04586* (2013.01); *H04N 1/00029* (2013.01); *H04N 1/00344* (2013.01)

(58) Field of Classification Search
  CPC .... B41J 2/04573; B41J 2/04586; B41J 2/165; H04N 1/00029; H04N 1/00344
  See application file for complete search history.

(56) References Cited

U.S. PATENT DOCUMENTS

| 6,708,138 | B1 * | 3/2004 | Zhang ................... G01B 21/04 702/182 |
| 8,099,310 | B2 * | 1/2012 | Kumisuwa ............. G06Q 10/00 705/7.12 |
| 8,164,778 | B2 * | 4/2012 | Kaneko .............. H04N 1/00344 358/1.14 |
| 9,283,762 | B2 * | 3/2016 | Tamai .................. B41J 2/16508 |
| 9,469,130 | B2 * | 10/2016 | Ikeda ....................... B41J 15/00 |
| 9,497,340 | B2 * | 11/2016 | Adachi ............. H04N 1/00002 |
| 2003/0156875 | A1 * | 8/2003 | Inoue ....................... B41J 2/165 400/74 |

FOREIGN PATENT DOCUMENTS

| JP | 06-316062 A | 11/1994 |
| JP | 11-129487 A | 5/1999 |
| JP | 2001-219566 A | 8/2001 |
| JP | 2011-131461 A | 7/2011 |

* cited by examiner

Primary Examiner — Anh T.N. Vo
(74) Attorney, Agent, or Firm — Foley & Lardner LLP

(57) ABSTRACT

A printer includes a printing unit which records (prints) on a recording medium (a rolled paper), and a control unit which controls a maintenance operation of the printing unit. The control unit displays maintenance timing information about timing at which the maintenance operation is to be performed on a display unit (an operation panel).

11 Claims, 11 Drawing Sheets

RECORDING APPARATUS, RECORDING SYSTEM, AND MAINTENANCE METHOD FOR RECORDING APPARATUS

BACKGROUND

1. Technical Field

The invention relates to a recording apparatus, a recording system, and a maintenance method for a recording apparatus.

2. Related Art

For the maintenance of printing quality of an ink jet printer, JP-A-6-316062 and JP-A-11-129487, for example, propose techniques for periodically performing head cleaning. The ink jet printer described in JP-A-6-316062 performs head cleaning when a predetermined number of characters are printed. When a predetermined number of cleaning operations are performed, the cleaning operations are performed with increased frequency and a message to encourage a user to replace the head is displayed. The ink jet printer described in JP-A-11-129487 determines the necessity of head cleaning from the elapsed time and the number of printed sheets since the previous cleaning operation. The ink jet printer which performs head cleaning suitably, refers to printing history, sets the next head cleaning timing in a period in which the user is unlikely to use the printer and performs the head cleaning in a period when the user does not use the printer.

SUMMARY

In the ink jet printers described in JP-A-6-316062 and JP-A-11-129487, however, there is a problem that head cleaning may be performed at timing unintended by the user. Specifically, since the user cannot know the timing at which downtime occurs by the head cleaning (start time and execution time) in advance, which causes a trouble in operation management by the user.

The invention is implementable as the following application examples or forms.

Application Example 1

A recording apparatus according to application example 1 includes a recording unit that records on a recording medium, and a control unit that controls a maintenance operation of the recording unit. The control unit notifies maintenance timing information about timing at which the maintenance operation is to be performed.

According to application example 1, since the control unit notifies maintenance timing information about timing at which the maintenance operation is to be performed, the user can know timing at which the maintenance operation is to be performed in advance by viewing the notified maintenance timing information. Therefore, operation management of the recording apparatus can be performed more properly.

Application Example 2

In the recording apparatus according to the application example 1, the control unit notifies the maintenance timing information by transmitting an email.

According to application example 2, since the control unit notifies the maintenance timing information by transmitting an email, the user who received the email can know the timing at which the maintenance operation is to be performed in advance by viewing the maintenance timing information. Therefore, operation management of the recording apparatus can be performed more properly.

Application Example 3

The recording apparatus according to the above application examples further includes a display unit. The control unit notifies the maintenance timing information by displaying on the display unit.

According to application example 3, since the control unit notifies the maintenance timing information by displaying on the display unit provided in the recording apparatus, the user can easily view the maintenance timing information, and know the timing at which the maintenance operation is to be performed in advance by viewing the display unit. Therefore, operation management of the recording apparatus can be performed more properly.

Application Example 4

In the recording apparatus according to the above application examples, the maintenance timing information is time to perform the maintenance operation.

According to application example 4, since the notified maintenance timing information is time to perform the maintenance operation, the user can plan a recording operation (plan setup of a recording job) more properly in the time to perform the maintenance operation.

Application Example 5

In the recording apparatus according to the above application examples, the maintenance timing information is an amount of recording before the maintenance operation is performed.

According to application example 5, since the notified maintenance timing information is an amount of recording before the maintenance operation is performed, the user can plan a recording operation (plan setup of a recording job) more properly with respect to an amount of recording (record load) before the maintenance operation is performed.

Application Example 6

In the recording apparatus according to the above application examples, notification is made when the maintenance timing information is equal to or lower than a predetermined value.

According to application example 6, since the control unit notifies a value of the maintenance timing information (time to perform the maintenance operation, or an amount of recording before the maintenance operation is performed) if the value becomes equal to or lower than a predetermined value, the user can know occurrence of downtime caused by the maintenance operation in advance (in or before a predetermined time). Therefore, the user can plan a recording operation (plan setup of a recording job) more properly with respect to predetermined time and an amount of recording before the maintenance operation is performed.

Application Example 7

In the recording apparatus according to the above application examples, the maintenance timing information is a time chart based on which the maintenance operation is performed.

According to application example 7, since the notified maintenance timing information is a time chart based on which the maintenance operation is performed, the user can plan printing (plan setup of a print job) more properly based on the time chart.

Application Example 8

The recording apparatus according to the above application examples further includes a receiving unit which receives an instruction which makes the maintenance operation be performed at arbitrary timing.

According to application example 8, since the recording apparatus includes a receiving unit which receives an instruction which makes the maintenance operation be performed at arbitrary timing, in planning of a recording operation (plan setup of a recording job), the user can make a maintenance operation be performed at more proper timing.

Application Example 9

In the recording apparatus according to the above application examples, a user maintenance operation performed at arbitrary timing as the maintenance operation can be planned in addition to a periodic maintenance operation performed at predetermined timing.

According to application example 9, since a user maintenance operation performed at arbitrary timing as the maintenance operation can be planned in addition to a periodic maintenance operation performed at predetermined timing, in planning of a recording operation (plan setup of a recording job), the user can make a desired maintenance operation be additionally performed at proper timing.

Application Example 10

In the recording apparatus according to the above application examples, the maintenance operation has plural levels of maintenance intensity, when plural maintenance operations are planned to be performed in a predetermined period, the control unit compares maintenance intensity among the plural maintenance operations, and controls so that a maintenance operation with the highest intensity is performed at the earliest planned timing, and that the rest of the maintenance operations are not performed.

According to application example 10, the control unit compares maintenance intensity among plural maintenance operations set in a predetermined period, and controls so that a maintenance operation with the highest intensity is performed at the earliest planned timing, and that the rest of the maintenance operations are not performed. Therefore, efficient maintenance can be performed for the recording unit. That is, in planning of a recording operation (plan setup of a recording job), a desired maintenance operation can be additionally performed at proper timing and, in addition, efficient maintenance with shorter downtime can be performed without performing excessive maintenance operations.

Application Example 11

A recording system according to application example 11 includes the recording apparatus according to the above application examples, and an information processing apparatus that can transmit and receive information to and from the recording apparatus. The control unit notifies the maintenance timing information by transmitting the maintenance timing information to the information processing apparatus.

According to application example 11, since the control unit notifies the maintenance timing information by transmitting the maintenance timing information to the information processing apparatus, the user can know the timing at which the maintenance operation is to be performed in advance by viewing the information processing apparatus. Therefore, operation management of the recording apparatus can be performed more properly.

Application Example 12

A maintenance method for a recording apparatus according to application example 12 includes performing a maintenance operation of a recording unit that records on a recording medium, and notifying maintenance timing information about timing at which the maintenance operation is to be performed.

According to application example 12, since maintenance timing information about timing at which the maintenance operation is to be performed is notified, the user can know timing at which the maintenance operation is to be performed in advance by viewing the notified maintenance timing information. Therefore, operation management of the recording apparatus can be performed more properly.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
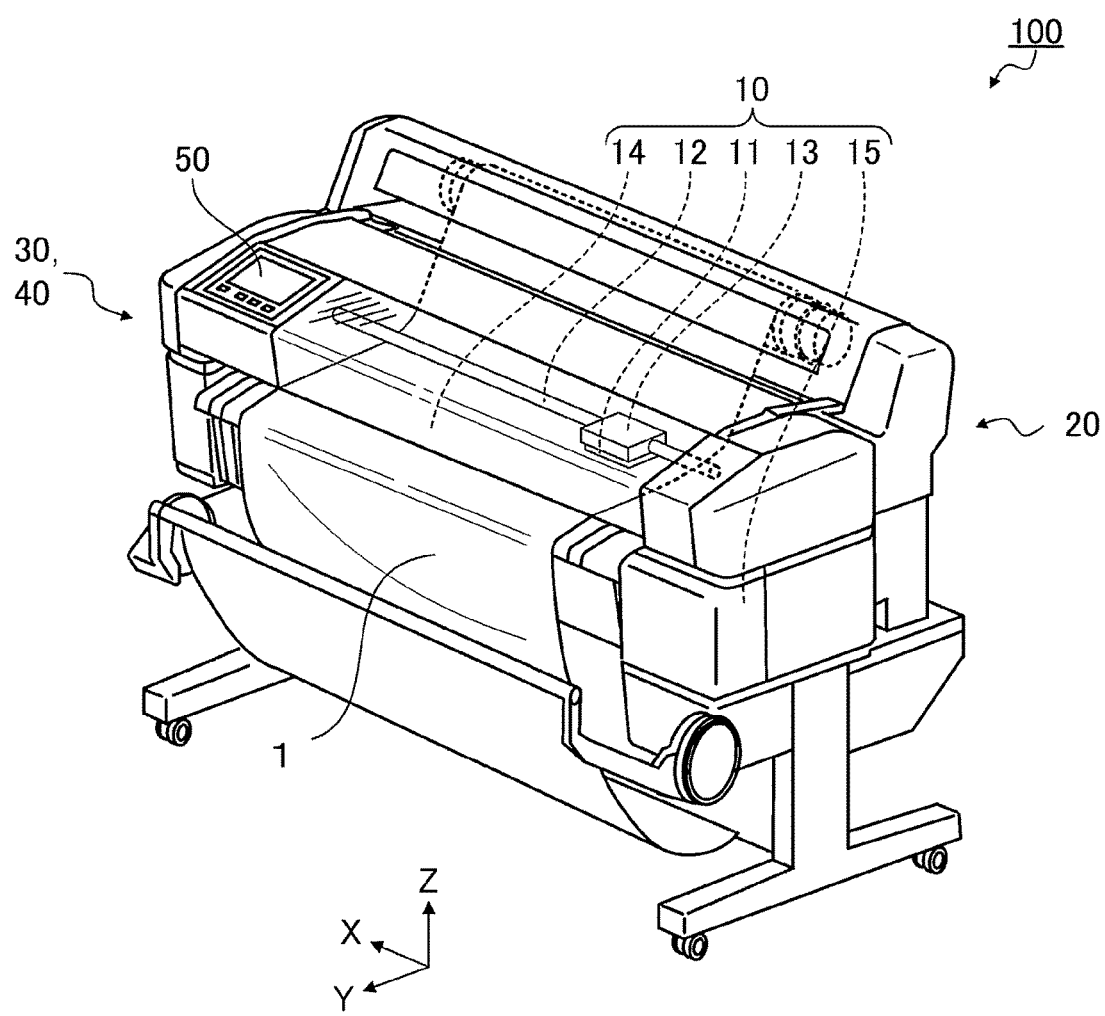
FIG. 1 is a perspective view of a printer as a recording apparatus according to a first embodiment.

Hereinafter, embodiments of the invention will be described with reference to the drawings. The embodiments of the invention are illustrative only, and not restrictive. Some components are described not in actual scale for the ease of illustration. In the coordinates in the drawings, a Z-axis direction represents a vertical direction, a +Z direction represents an upper direction, a Y-axis direction represents a front/rear direction, a +Y direction represents a front direction, an X-axis direction represents a left/right direction, a +X direction represents a left direction, and an X-Y plane represents a horizontal plane.

First Embodiment

Basic Configuration of Printer

Figure 2:
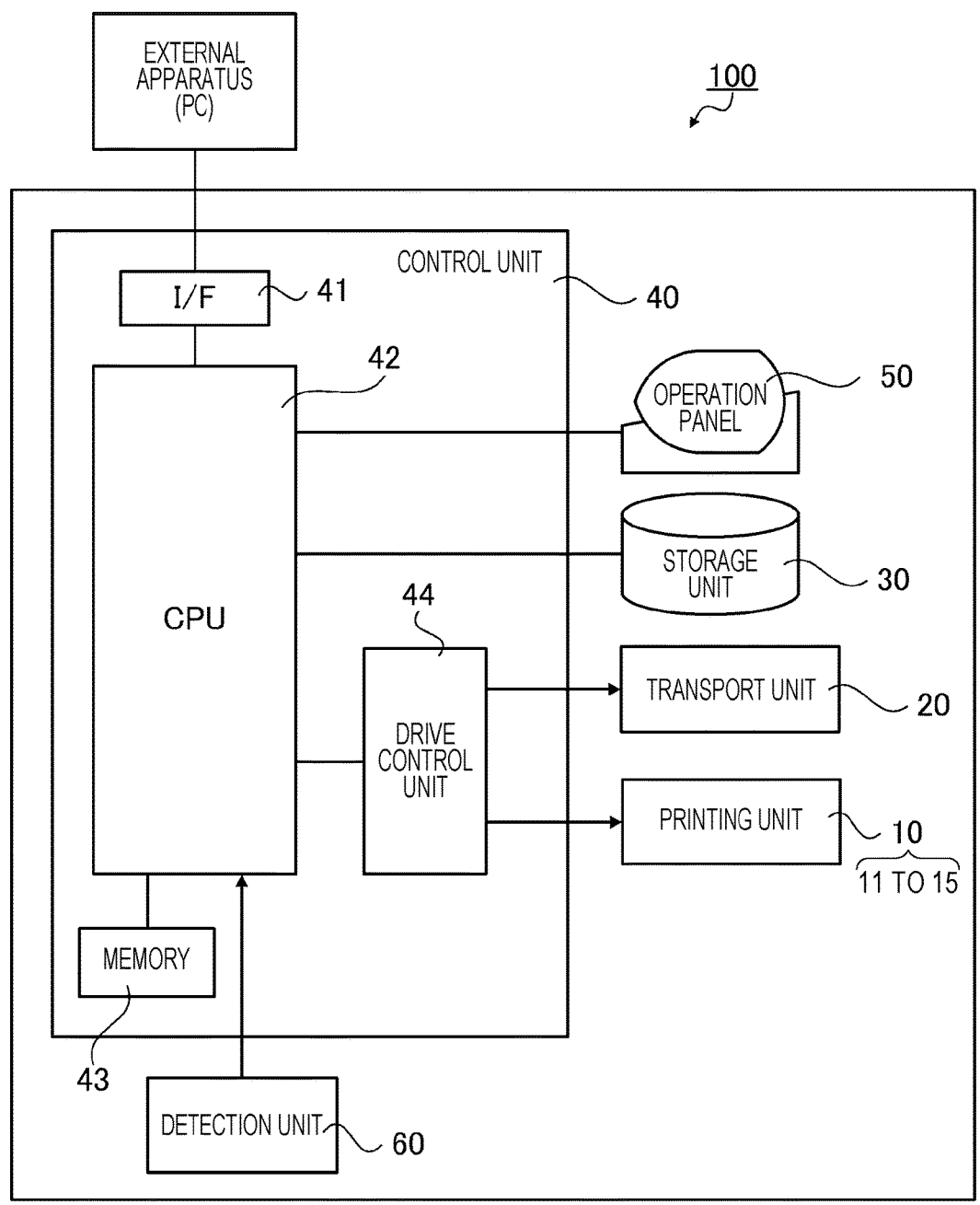
FIG. 2 is a block diagram of a configuration of the printer.

FIG. 1 is a perspective view of a printer 100 as a "recording apparatus" according to a first embodiment. FIG. 2 is a block diagram of a configuration of the printer 100. The printer 100 is a large-sized ink jet printer capable of "printing" as an example of "recording" on a printing medium (a paper sheet) of relatively large sizes, such as JIS A0 and JIS B0. The printer 100 includes a printing unit 10 as a "recording unit," a transport unit 20, a storage unit 30, a control unit 40, an operation panel 50, and a detection unit 60 (see FIG. 2). The printing medium as a "recording medium" (rolled paper 1 illustrated in FIG. 1) is held in a rolled state and is supplied for recording.

The printing unit 10 includes an ink jet head which ejects ink at a surface of the rolled paper 1 and forms (prints) an image (hereafter, referred to as a head 11), a guide shaft 12 provided to extend in a width direction (the X-axis direction) of the rolled paper 1, a carriage 13 which supports the head 11 so as to face the rolled paper 1, and can move in the X-axis direction along the guide shaft 12 to scan, a support mechanism 14 which supports the rolled paper 1 and an ink tank 15 in the printing unit 10.

The head 11 is constituted by plural nozzle groups provided for each type of the ink 2 to be ejected. The type of the ink 2 corresponds to the different colors of ink, such as yellow, magenta, cyan, black, and transparent. The ink tank 15 stores the ink 2. The ink 2 stored in the ink tank 15 is supplied to the head 11 through an ink supply path 80 (described below). The ink tank 15 and the ink supply path 80 communicating with the ink tank 15 are provided independently for each type of the ink 2.

The storage unit 30 is a rewritable storage medium, such as a hard disk drive (HDD) and a memory card. The storage unit 30 stores software (a program), a printing job, etc. operated by the control unit 40. The printing job is a series of request information for making printing be performed (e.g., control commands including print data for printing), and can be spooled to the storage unit 30. The spooled printing job is performed in a performing order rearranged as necessary.

The control unit 40 includes an interface unit 41, a CPU 42, memory 43, and a drive control unit 44, and performs central control of the entire printer 100. The interface unit 41 transmits and receives data between an external apparatus (e.g., a personal computer) and the printer 100. The CPU 42 is an arithmetic processing unit which controls the entire printer 100. The memory 43 is an area in which a program operated by the CPU 42 is stored or in which necessary information is recorded. The memory 43 is constituted by a storage element, such as RAM, ROM, and flash memory.

The CPU 42 controls the drive control unit 44 and the detection unit 60 in accordance with the program stored in the storage unit 30 and the memory 43, and the printing job, etc. and controls the printing unit 10, the transport unit 20, etc. via the drive control unit 44. The operation panel 50 is an input/output section (e.g., a touch panel) as a human interface, and includes a display means and an input means as a "display unit." On the operation panel 50, instructions to the control unit 40, selection of operations, display of control information necessary for the operation of the control unit 40, etc., can be performed.

The detection unit 60 is constituted by plural detection device groups provided at predetermined positions inside an apparatus main body, such as the printing unit 10 and the transport unit 20 (e.g., a linear encoder, a rotary encoder, and an optical sensor). The detection unit 60 detects (monitors) an operating condition inside the printer 100 and notifies the control unit 40 of the detection result. Specifically, the detection unit 60 monitors, for example, the position of the carriage 13 which moves along the guide shaft 12 to scan, a set position in a width direction (the X-axis direction in FIG. 1) and a transport condition (existence of a jam, etc.) of the rolled paper 1 in the transport unit 20, existence and a residual amount of the rolled paper 1, and existence and a residual amount of the ink in the printing unit 10.

The transport unit 20 constitutes a transport mechanism and a path from the supply of the rolled paper 1 before printing stored inside the apparatus main body to the printing unit 10 to the discharge of the rolled paper 1 after printing and then cutting. On the rolled paper 1 supplied to the printing unit 10 by the transport unit 20, the control unit 40 forms (prints) a desired image by repeating an operation of ejecting ink droplets (the ink 2) from the head 11 while moving the carriage 13 which supports the head 11 along the guide shaft 12 in a scanning direction (the X-axis direction), and an operation of moving the rolled paper 1 by the transport unit 20 in the transport direction (the +Y direction) which crosses the scanning direction (the X-axis direction).

Ink Jet Head

Figure 3:
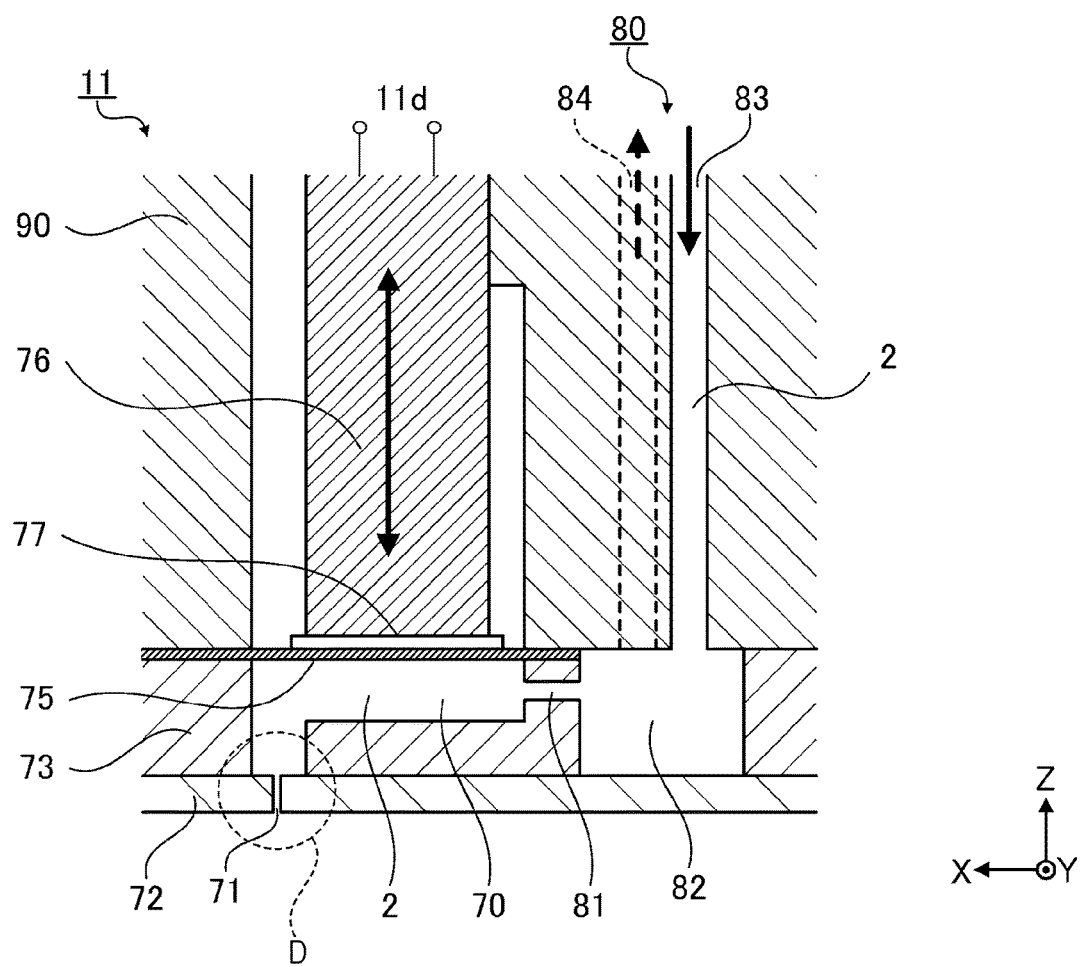
FIG. 3 is a schematic cross-sectional view of a head.
Figure 4:
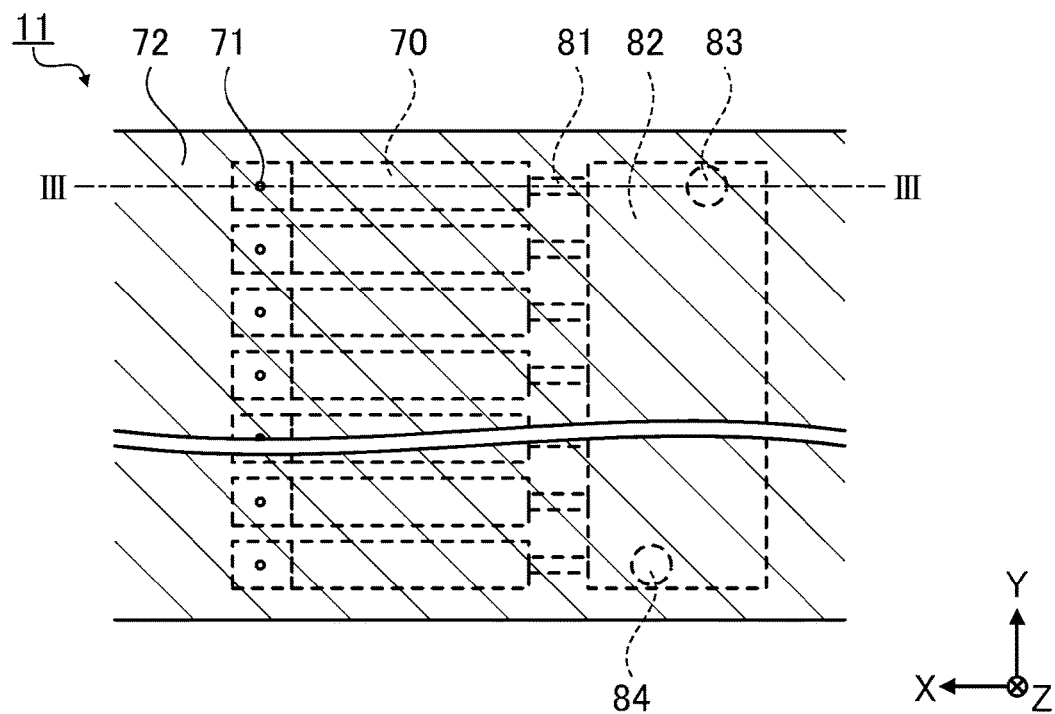
FIG. 4 is a schematic plan view of a head.

FIG. 3 is a schematic cross-sectional view and FIG. 4 is a schematic plan view of the head 11. FIG. 3 is a cross-sectional view along line III-III of FIG. 4, and FIG. 4 is a plan view seen from below (−Z direction) of FIG. 3. A desirable ink jet head system is a piezo system. In the piezo system, pressure in accordance with recording information signals is applied to the ink by piezoelectric elements so as to eject ink droplets for recording.

The head 11 includes, as an ejecting system of the ink 2, plural cavities 70 filled with the ink 2, nozzles 71 each communicating with a downstream portion of an ink channel of the cavity 70, and through which the ink 2 contained in the cavity 70 is ejected, a nozzle substrate 72 on which the plural nozzles 71 are formed, a cavity substrate 73 which forms the plural cavities 70, a vibrating plate 75 which constitutes a ceiling portion of the cavities 70, a piezoelectric element 76 which vibrates the vibrating plate 75, a joint plate 77 which joins the vibrating plate 75 and the piezoelectric element 76, and a head base 90.

The head 11 includes, as a supply system of the ink 2 to the cavity 70, communicating paths 81 each communicating with an upstream portion of the ink channel of the cavity 70, a manifold 82 which supplies the ink 2 to the plural communicating paths 81, an ink introduction path 83 which circulates and supplies the ink 2 to the manifold 82, and an ink discharge path 84 which circulates and discharges the ink 2 from the manifold 82.

The cavity 70 is a pressure chamber which makes the ink 2 be ejected as ink droplets from the nozzle 71. Each of the cavities 70 is substantially rectangular parallelepiped in shape and extends in the X-axis direction. Plural cavities 70 are arranged in the Y-axis direction on the cavity substrate 73. An end portion of the cavity 70 in the +X direction extends in the −Z direction and forms an area of a downstream portion of the ink channel communicating with the nozzle 71. The nozzles 71 are formed as plural through holes arranged in the Y-axis direction on the nozzle substrate 72 which extends on an X-Y plane. Since areas of the nozzle substrate 72 in which the nozzles 71 are formed overlap areas of the downstream portion of the ink channel of the cavities 70 arranged in the same pitches, the cavities 70 and the nozzles 71 are made to communicate with each other as illustrated by D in FIG. 3.

The vibrating plate 75 is held between the cavity substrate 73 and the head base 90 so as to form the ceiling portion of the cavity 70. The piezoelectric element 76 is driven by a head driver 11d of which driving is controlled in accordance with recording control of the control unit 40. The piezoelectric element 76 is accommodated in the head base 90. One of end portions of the piezoelectric element 76 is fixed to the head base 90. The other of the end portions of the piezoelectric element 76 is joined to the vibrating plate 75 via the joint plate 77. The head 11 ejects the ink 2 contained in the cavity 70 through the nozzle 71 communicating with the cavity 70 when capacity of the cavity 70 changes by vibration of the vibrating plate 75 caused by the piezoelectric element 76.

The system of the ink jet recording head is not limited to the piezo system described above and may be other recording systems that eject ink as ink droplets and form a dot group on a recording medium. For example, a system in which the ink is continuously ejected as ink droplets through a nozzle by a strong electric field between a liquid ejection nozzle (hereinafter, "nozzle") and an accelerating electrode located ahead of the nozzle, and recording is performed by applying recording information signals from a deflecting electrode while the ink droplets are flying, a system in which ink droplets are ejected in accordance with recording information signals without deflection (an electrostatic suction system), a system in which ink droplets are forcibly ejected by applying pressure to the ink with a small sized pump and mechanically vibrating a nozzle with a quartz resonator etc., and a system in which the ink is heated and foamed with a micro electrode in accordance with recording information signals and ejected as ink droplets for recording (a thermal jet system).

Figure 5:
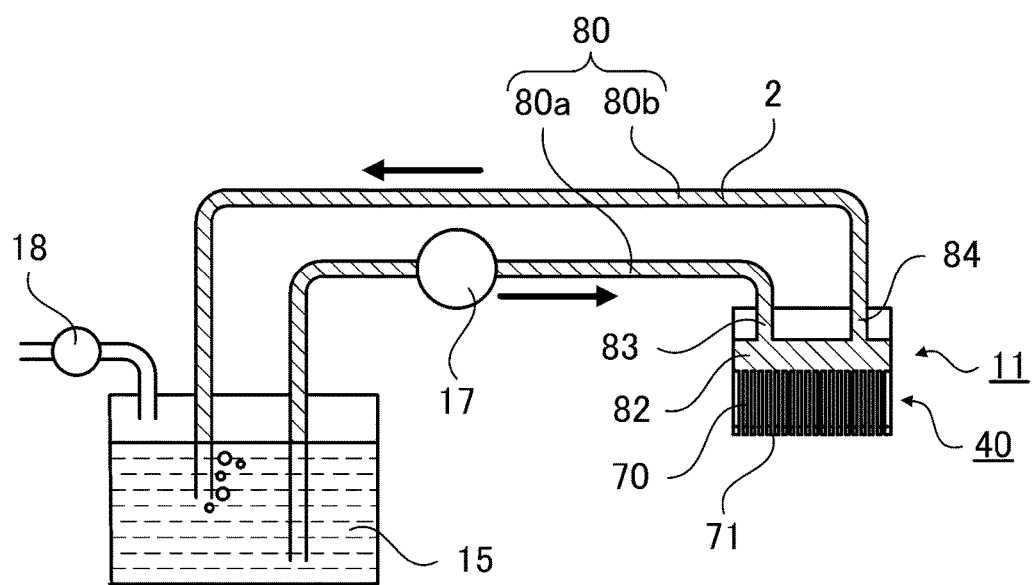
FIG. 5 is a schematic diagram of an ink supply path.

FIG. 5 is a schematic diagram of the ink supply path 80. The ink supply path 80 is a supply path for supplying the ink 2 to plural cavities 70, and is constituted by a circulation path including a forward path 80a from the ink tank 15 to the manifold 82 (the ink introduction path 83) and a return path 80b from the manifold 82 to the ink tank 15 (the ink discharge path 84). The forward path 80a includes a pump 17 which sends the ink 2 within the ink supply path 80 with pressure. Under the control of the control unit 40, the pump 17 can change a speed at which the ink 2 within the ink supply path 80 is sent with pressure.

As illustrated in FIG. 5, the ink tank 15 stores the ink 2 inside, and sends the ink in an area including no air bubbles to the forward path 80a. The ink tank 15 includes a pump 18 which performs pressure control within the ink tank 15. Under the control of the control unit 40, the pump 18 can change pressure within the ink tank 15.

Maintenance of Recording Unit (Printing Unit)

In the printer 100 of the above-described configuration, there is a possibility that the ink droplets are not properly ejected from the head 11 due to, for example, thickening of the ink 2, generation of air bubbles in the ink supply path 80 and the cavities 70, clogging of the nozzles 71, residues of the ink 2 on the nozzle surface (a lower surface of the nozzle substrate 72), whereby printing quality is reduced due to dot omission of the print image, etc. Therefore, the printer 100 periodically performs a maintenance operation of the printing unit 10 under the control of the control unit 40 in order to maintain the printing quality stably. A specific example of the maintenance operation will be described.

In order to remove assumed destabilizing factors, the maintenance operation includes plural operations, such as wiping of the nozzle surface (the lower surface of the nozzle substrate 72), flushing to forcibly eject the ink 2 from the nozzles, and stirring the ink 2 by ink circulation in the ink supply path 80. Plural levels of maintenance intensity are set for each maintenance operation depending on the setup of intensity, time, etc. to perform. The maintenance intensity is expected intensity of an effect to remove factors which hinder stable ejection of the ink 2. Hereinafter, a specific example of the maintenance operation will be described.

Figure 6:
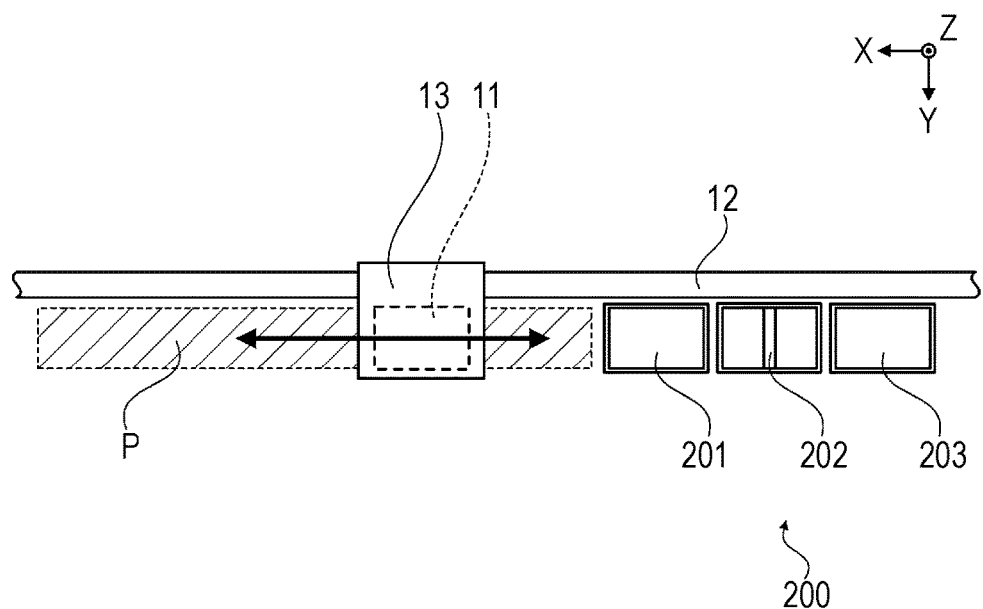
FIG. 6 is a plan view of an arrangement of a maintenance unit.

FIG. 6 is a plan view of an arrangement of a maintenance unit 200 which performs flushing and wiping of the maintenance operation. The printer 100 includes the maintenance unit 200 outside (the −X side in the example illustrated in FIG. 6) a printing area P in which printing is performed by the head 11 by ejecting the ink 2 at the rolled paper 1 while the carriage 13 is moving in the X-axis direction to scan. A flushing unit 201, a wiping unit 202, and a cap 208 are disposed in this order in the maintenance unit 200. The control unit 40 can move the carriage 13 (the head 11) to this area across the printing area P.

Flushing

There is a possibility that the ink droplets are not ejected properly due to thickening of the ink 2 near the nozzles 71 or clogging of the nozzles 71. In this case, the control unit 40 moves the carriage 13 (the head 11) to the flushing unit 201, and performs flushing which is an operation to cause the ink 2 to be ejected toward the flushing unit 201 from the nozzles 71 for which maintenance is determined to be necessary. The flushing unit 201 absorbs the ejected ink 2 when the flushing is performed. With the flushing, the thickened ink 2 can be removed from the heads 11 or the clogging of the nozzles 71 can be canceled.

Different levels of maintenance intensity are set depending on the amount of the ink 2 to be ejected at a single flushing event, the number of times of ejection, and whether maintenance is performed only to a predetermined nozzle 71 or to all the nozzles 71, for example.

Wiping

Figure 7:
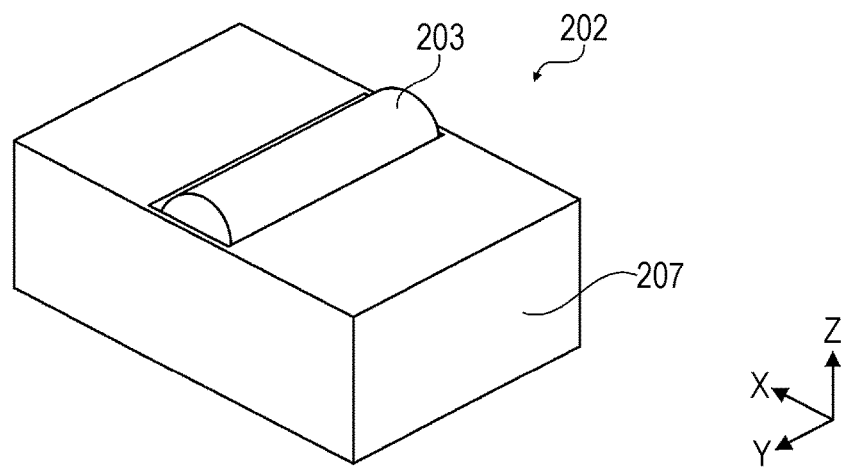
FIG. 7 is a perspective view of a wiping unit.
Figure 8:
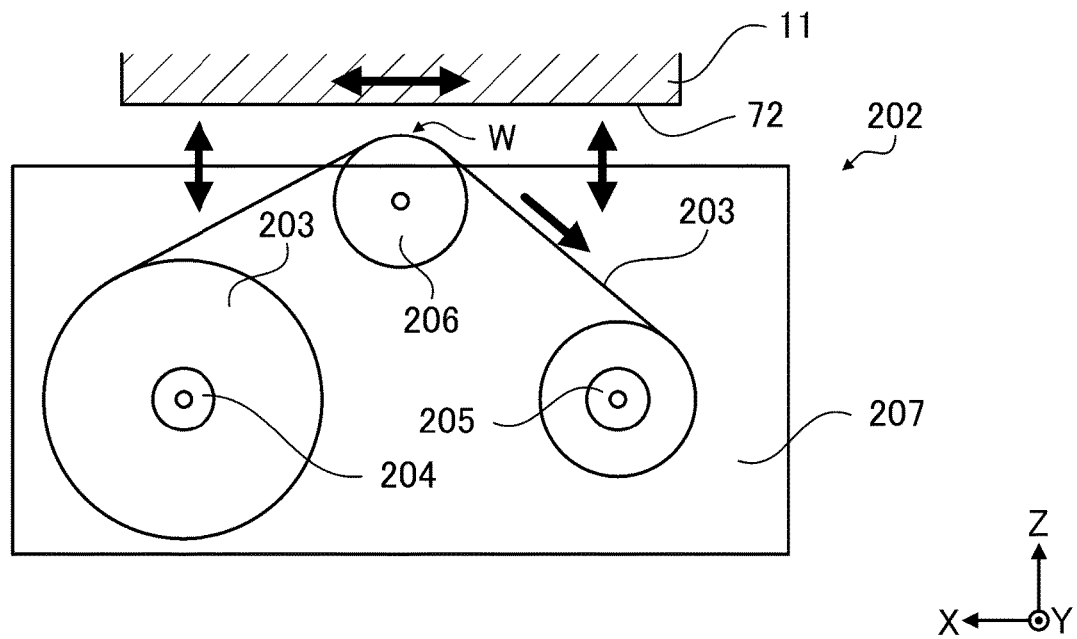
FIG. 8 is a cross-sectional view of a configuration of the wiping unit.

FIG. 7 is a perspective view of the wiping unit 202, and FIG. 8 is a cross-sectional view of a configuration of the wiping unit 202. The ink 2 ejected from the nozzles 71 may remain on the nozzle surface (the lower surface of the nozzle substrate 72) near the nozzles 71. The control unit 40 performs wiping which is an operation to sweep the nozzle surface with a wiping member 203 provided in the wiping unit 202 (an operation to rub the ink off), and removes (cleans) the ink 2 adhering to the nozzle surface. The wiping unit 202 is constituted by the wiping member 203, a material-feeding roller 204, a material-removing roller 205, a pressure roller 206, a housing 207, a wiper unit driving mechanism (not illustrated), etc.

The material-feeding roller 204 and the material-removing roller 205 having an axis in the Y-axis direction are accommodated in the housing 207 with a distance therebetween in the X-axis direction. An absorption member (the wiping member 203) which wipes the ink remaining on the surface of the nozzle substrate 72 away is provided to stretch between the material-feeding roller 204 and the material-removing roller 205. The material-feeding roller 204 sends the unused wiping member 203 wound around the material-feeding roller 204. The material-removing roller 205 takes up the used wiping member 203 which has been sent out from the material-feeding roller 204 and used for wiping.

The pressure roller 206 having an axis substantially parallel to the material-feeding roller 204 and the material-removing roller 205 is exposed from the housing 207 at the ceiling portion of the housing 207. The wiping member 203 which is sent from the material-feeding roller 204 is wound around the pressure roller 206 and taken up by the material-removing roller 205 after use.

The wiper unit driving mechanism has functions to drive the material-feeding roller 204 and the material-removing roller 205 to rotate, and to move a wiping portion W of the wiping member 203 supported by the pressure roller 206 to an ink wiping position on the nozzle substrate 72 and move the wiping portion W from the ink wiping position. These functions are controlled by the control unit 40.

Different levels of maintenance intensity are set depending on pressing intensity of the pressure roller 206, speed and length with which the wiping member 203 is moved while being pressed by the pressure roller 206, etc. In the wiping, the ink 2 adhering to the nozzle substrate 72 may be wiped with a flexible plate member in contact with the surface of the nozzle substrate 72 while moving the plate member and the nozzle substrate 72 relatively.

The cap 208 is in close contact with the nozzle substrate 72 and airtightly seals a surface on which the nozzles of the head 11 are formed while the printer 100 is not operated so as to avoid thickening or solidifying of the ink 2 in the head 11.

Ink Circulation

If thickening of the ink or viscosity unevenness occur due to deposition of ink compositions, etc. at parts where the ink 2 touches the air, or if air bubbles enter the ink supply path 80 (see FIG. 5) or air bubbles are generated in the cavities 70 or enter the cavities 70 (see FIG. 3), there is a possibility that the ink 2 is not supplied properly or the ink 2 is not ejected properly. In this case, the control unit 40 controls the pump 17 in the ink supply path 80 to increase the speed at which the ink is circulated forcibly. In the circulation path of the ink 2, the ink 2 is stirred by forced circulation with increased speed, and the air bubbles entered the circulation path of the ink 2 are trapped at the ink tank 15. Factors which make the ejection of the ink 2 unstable are thus improved.

These maintenance operations are desirably performed with sufficient evaluation in advance, at proper timing at which ejection of the ink 2 becomes unstable, and with appropriate maintenance intensity. The maintenance operation of the printer 100 is performed under the control of the control unit 40 in accordance with a program set as a "periodic maintenance operation" to be performed at predetermined timing depending on operating conditions of the printer 100 so that the maintenance operation is performed properly.

However, since the maintenance operation sometimes takes time, there is a problem that if the maintenance operation is performed at timing not intended by the user, downtime caused by the maintenance operation may disturb the printing operation (especially production control of the printing operation). In the present embodiment, the control unit 40 notifies the user of the maintenance timing information about timing at which a predetermined maintenance operation, "the periodic maintenance operation," is to be performed. Hereinafter, notification of the maintenance timing information by which the present embodiment is characterized will be described.

For the ease of description, the plural maintenance operations described above will be referred to as maintenance An, maintenance Bn, and maintenance Cn. n is a numerical value representing maintenance intensity set for each maintenance operation. For example, assuming that three levels of maintenance intensity are set and the maintenance intensity increases as n becomes larger like 1, 2 and 3. Specifically, in the maintenance operation of the maintenance An, the maintenance intensity increases in the order of maintenance A1, A2, and A3.

Example 1

In Example 1, information before the maintenance operation is performed is displayed on the operation panel 50. Examples of the information before the maintenance operation is performed include time to perform the maintenance operation, an amount of recording before the maintenance operation is performed, etc. The user can select content to display.

Figure 9:
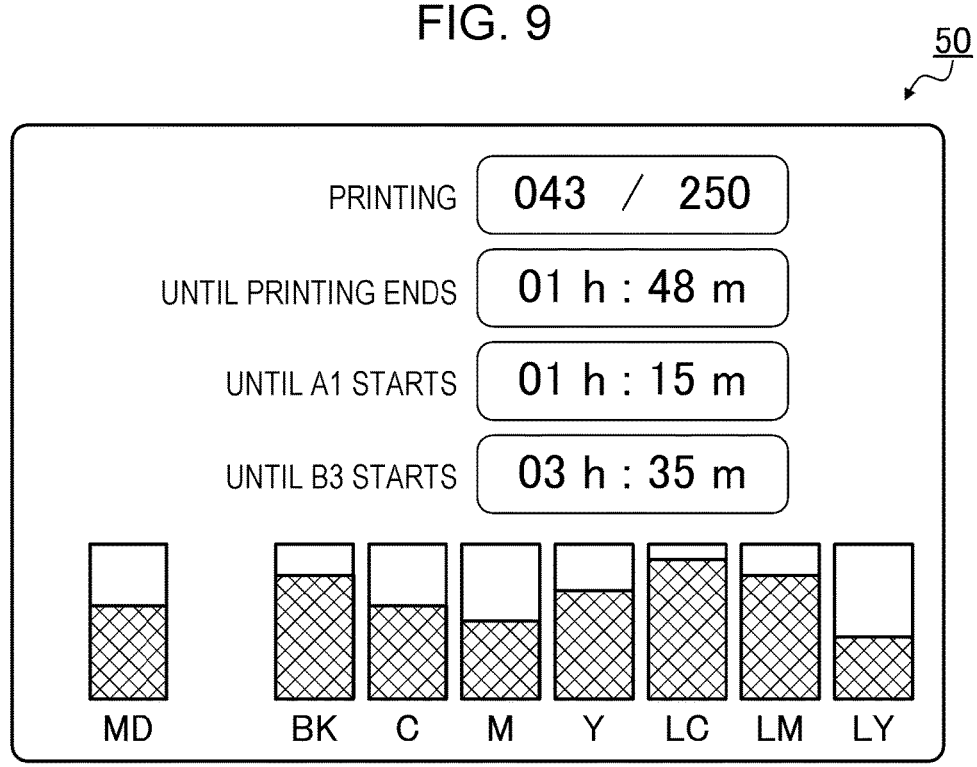
FIG. 9 is a display example of an operation panel on which maintenance timing information (time to start) is displayed.

FIG. 9 illustrates a display screen example of the operation panel 50 on which maintenance timing information is displayed. The example illustrated in FIG. 9 shows time to perform the maintenance operation. Specifically, on the operation panel 50, there is a display on the right side of "printing" showing that 43 of printing load (e.g., the number of print images) instructed to be printed under a set print condition have been completed out of 250 and estimated time (1 hour and 48 minutes) to end of 250 of printing load is displayed in "until printing ends" therebelow. As the maintenance timing information, time to start the maintenance A1 (1 hour and 15 minutes) is displayed in "until A1 starts" and time to start the maintenance B3 (3 hours and 35 minutes) is displayed in "until B3 starts" at the central position of the operation panel 50.

By viewing the display screen, the user can know that the maintenance A1 is performed before the printing load 250 instructed to the printer 100 to perform is completed, and printing is completed before the maintenance B3 is started. For example, if the downtime caused by the maintenance A1 is short, it is confirmed that there is no large trouble in completion of the printing load 250 and, even if the downtime caused by the maintenance B3 is long, it is confirmed that the maintenance B3 does not affect printing.

The maintenance timing information is displayed on the operation panel 50 when the time to perform the maintenance operation becomes predetermined time or shorter. Specifically, for example, if the predetermined time is set to 10 hours, the maintenance timing information (in the above example, time to perform the maintenance operation) is displayed when time to perform either of the maintenance operations becomes shorter than 10 hours (from the time at which the time becomes shorter than 10 hours). The user can designate the predetermined time at which display of the maintenance timing information on the operation panel 50 is started. One example of which is a case where operators are working to perform operation management of the printer 100 on three shift 24 hours (each 8 hours). In such a case, it is sufficient to grasp the situation after 10 hours. A function to display the maintenance timing information at timing at which predetermined time has come (e.g., 1 hour before) may also function as an alert to the user (the operator). Therefore, the display on the operation panel 50 may be made with sound or by changing color of display.

Figure 10:
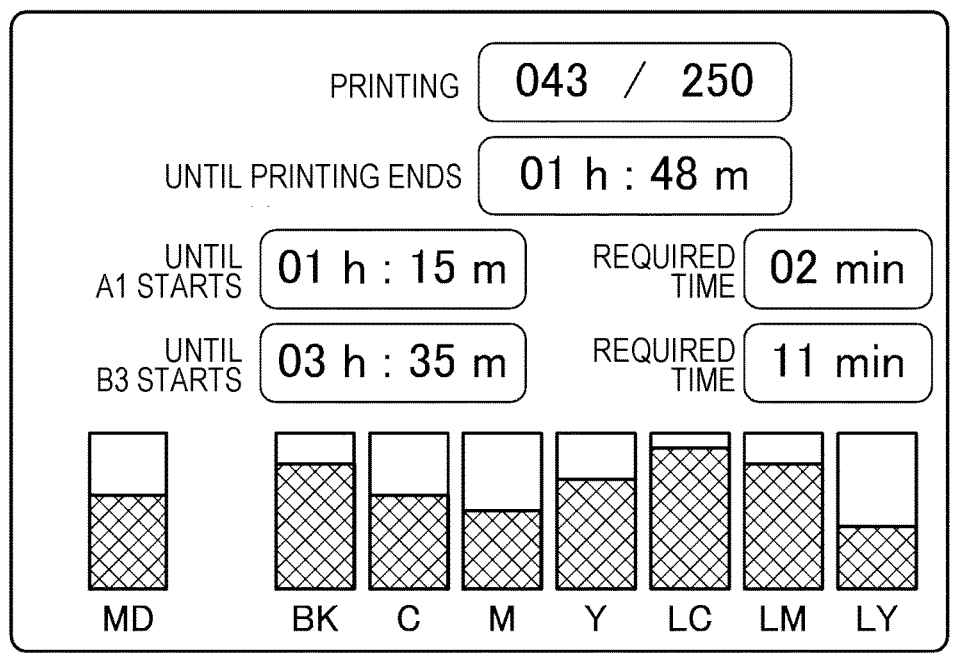
FIG. 10 is a display example of an operation panel on which maintenance timing information (time to start and required time) is displayed.

In a case where required time for the maintenance A1 and the maintenance B3 is known in advance, as illustrated in FIG. 10 for example, "required time" may be displayed in addition to the time to start each of the maintenance A1 and the maintenance B3. Instead of time to start each maintenance operation, start time may be displayed. In a lower area of each screen example, a residual amount "MD" of the rolled paper 1, and residual amounts "BK" to "LY" of each types of the ink 2 are displayed by bar graphs for the convenience of the user.

Figure 11:
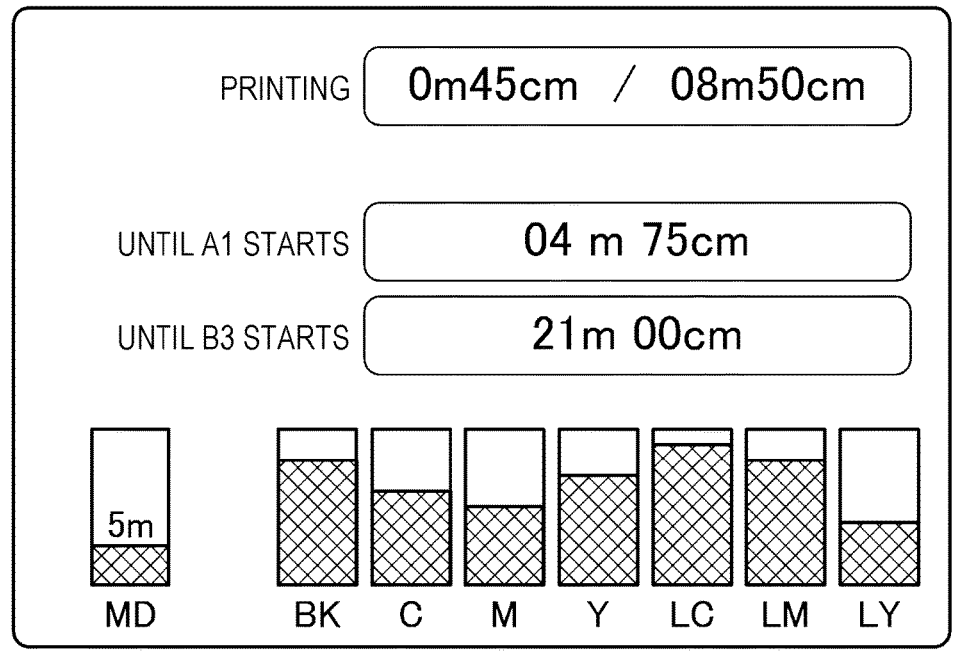
FIG. 11 is a display example of an operation panel on which maintenance timing information (an amount of printing before start) is displayed.

FIG. 11 illustrates an example in which an "amount of recording" (amount of printing) before the maintenance operation is performed is displayed as the maintenance timing information. The amount of recording before the maintenance operation is performed changes depending on the forms and specifications of the printing media. For example, if the printing medium is elongated like the rolled paper 1, the amount of recording is displayed as the length [m] and [cm] and, if the printing medium is cut sheet paper, the amount of recording is displayed as the printing number of the paper sheets.

In the present embodiment, since the printing medium is the rolled paper 1, specifically, on the operation panel 50, there is a display on the right side of "printing" showing that 45 cm of printing load (e.g., a consumption length of the rolled paper 1) instructed to be printed under a set print condition have been completed out of 8 m 50 cm. As the maintenance timing information, the printing length (4 m 75 cm) of the rolled paper 1 before the maintenance A1 is started is displayed in "until A1 starts" and the printing length (21 m) of the rolled paper 1 before the maintenance B3 is started is displayed in "until B3 starts" at the central position of the operation panel 50. The length of the residual amount (in the example of FIG. 11, 5 m) is displayed in the residual amount "MD" of the rolled paper 1.

Example 2

In Example 1, an example in which the information about until the maintenance operation is performed is displayed as notification of the maintenance timing information is described. In Example 2, an example in which execution timing of the maintenance operation to be performed in a predetermined period is displayed in a time chart as the maintenance timing information will be described. The predetermined period to be displayed as the time chart can be set by the user. If maintenance content to be performed with the execution of printing is included in the maintenance operation, the time chart is generated based on the input content of the print job (printing load).

Figure 12:
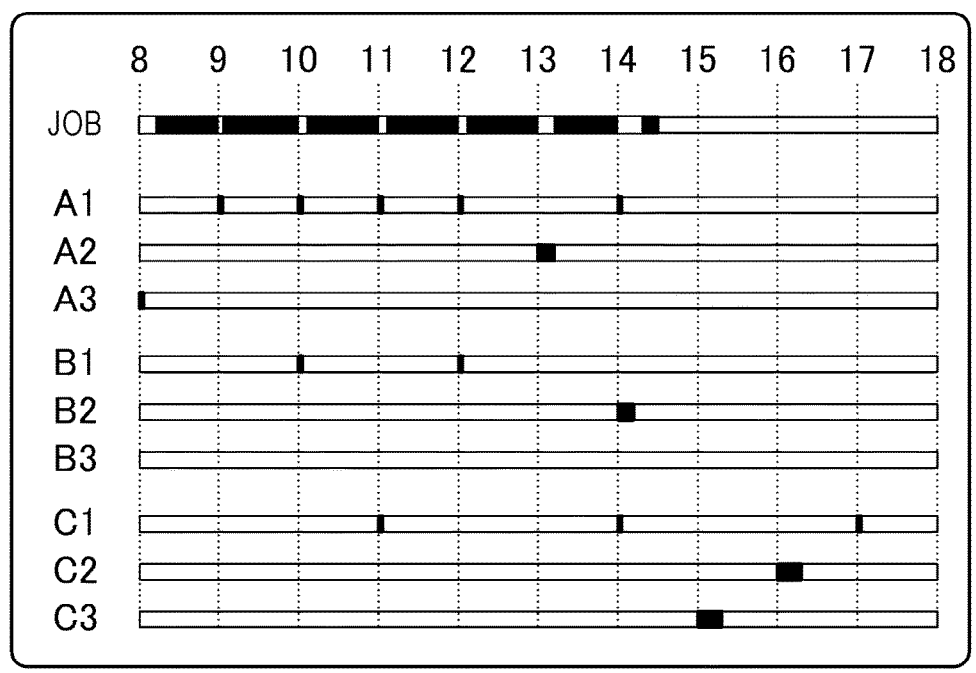
FIG. 12 is a display example of an operation panel on which maintenance timing information (a time chart) is displayed.

FIG. 12 illustrates a display screen example of the operation panel 50 on which a time chart based on which the maintenance operations are performed is displayed as the maintenance timing information. FIG. 12 illustrates an example in which a predetermined period in which the time chart is displayed is 10 hours (from 8:00 to 18:00). The uppermost lateral bar "Job" shows that the estimated time at which the print job designated at current time 8:00 will be completed at 14:30. Timings at which the maintenances A1 to C3 are to be performed are displayed by lateral bars "A1" to "C3" in this order from the top. Periods in which the maintenance operation is performed and printing is stopped are displayed in white blanks in the lateral bar of "Job."

For example, the maintenance A1 is performed every 1 hour based on the execution of the print job, and is a maintenance operation completed in about 2 to 3 minutes, and the maintenance A2 is performed every 5 hours based on the execution of the print job, and is a maintenance operation which takes about 10 minutes. The maintenance A1 is not performed at 13:00 because the maintenance A2 of which maintenance intensity is higher than that of the maintenance A1 is performed at that time. The maintenance A3 is a maintenance operation performed when starting a print job after the printer 100 is started. For example, these maintenance operations (A1 to A3) are performed at predetermined timings only in the period in which the print job is performed.

For example, the maintenance B1 is performed every 2 hours based on the execution of the print job, and is a maintenance operation completed in about 2 to 3 minutes, and the maintenance B2 is performed every 6 hours based on the execution of the print job, and is a maintenance operation which takes about 10 minutes. The maintenance B1 is not performed at 14:00 because the maintenance B2 of which maintenance intensity is higher than that of the maintenance B1 is performed at that time. Execution timing of the maintenance B3 is not displayed because it is unnecessary to perform the maintenance B3 in the period until the designated print job is completed.

The maintenances C1 to C3, for example, represent the maintenance operations performed at predetermined intervals irrespective of existence of print jobs. For example, the maintenance C1 is performed every 3 hours, and is a maintenance operation completed in about 2 to 3 minutes, and the maintenance C2 is performed every shift of 8 hours, for example, and is a maintenance operation which takes about 10 minutes. The maintenance C3 is performed once in one week at 15:00, for example, and is a maintenance operation which takes about 10 minutes.

Since the maintenances "A1" to "B3" are maintenance operations performed based on the execution of the print job, information about the maintenances "A1" to "B3" is generated based on the setup of the print job. However, if no print job is specified, it is desirable to display intervals assuming standard print specifications, for example, as reference information to the user (the operator).

As described above, according to the recording apparatus of the present embodiment (the printer 100), the following effects can be obtained. Since the control unit 40 notifies maintenance timing information about timing at which the maintenance operation is to be performed, the user can know timing at which the maintenance operation is to be performed in advance by viewing the notified maintenance timing information. Therefore, operation management of the printer 100 can be performed more properly.

Since the control unit 40 notifies the maintenance timing information by displaying on the operation panel 50 provided in the printer 100, the user can easily view the maintenance timing information, and know the timing at which the maintenance operation is to be performed in advance by viewing the operation panel 50. Therefore, operation management of the printer 100 can be performed more properly.

If the notified maintenance timing information is time to perform the maintenance operation, the user can plan a printing operation (plan setup of a printing job) more properly before the time when the maintenance operation is performed.

If the notified maintenance timing information is an amount of printing before the maintenance operation is performed, the user can plan a printing operation (plan setup of a printing job) more properly with respect to an amount of printing (print load) before the maintenance operation is performed.

Since the control unit 40 notifies a value of the maintenance timing information (time to perform the maintenance operation, or an amount of printing before the maintenance operation is performed) if the value becomes equal to or lower than a predetermined value designated by the user, the user can know occurrence of downtime caused by the maintenance operation in advance (in or before a predetermined time). Therefore, the user can plan a printing operation (plan setup of a printing job) more properly with respect to predetermined time and an amount of printing before the maintenance operation is performed.

If the notified maintenance timing information is a time chart based on which the maintenance operations are performed, the user can plan printing (plan setup of a print job) more properly based on the time chart. Especially, since all of the maintenance operations to be performed in the period designated by the user or the operator can be known, downtime that is not expected by the user or the operator does not occur, whereby disturbance to the management of the printing operation is reduced.

Although an example in which a time chart based on which the maintenance operations are performed is displayed on the operation panel 50 as the maintenance timing information is described above, the information may be displayed on a display device of an external apparatus (e.g., a personal computer) connected to the printer 100 instead of the operation panel 50. For example, the control unit 40 may notify the maintenance timing information to the personal computer connected to the printer 100 by transmitting an email. The user who received the email can know the timing at which the maintenance operation is to be performed in advance by viewing the maintenance timing information. Therefore, operation management of the printer 100 can be performed more properly.

The effects of the above embodiment are obtained as the effects by the apparatus configuration of the printer 100 as the recording apparatus, and may also be regarded as effects of the maintenance method for the printer 100. That is, the maintenance method for the printer 100 includes performing the maintenance operation of the printing unit 10 that records on the rolled paper 1, and notifying the maintenance timing information about timing at which the maintenance operation is to be performed. According to this method, since the maintenance timing information about timing at which the maintenance operation is to be performed is notified, the user can know timing at which the maintenance operation is to be performed in advance by viewing the notified maintenance timing information. Therefore, operation management of the printer 100 can be performed more properly.

Second Embodiment

Next, a printer 101 (not illustrated) as a recording apparatus according to a second embodiment will be described. In the description, the same constituent parts as those of the above embodiment are denoted by the same reference numerals and repeated description is omitted.

In the first embodiment, conditions under which the predetermined maintenance operation (the periodic maintenance operation) is performed are displayed as the maintenance timing information, whereby the user and the operator can know the content in advance. Therefore, the user and the operator can plan the printing operation (plan setup of the print job) more properly to the recording apparatus (the printer 100). In the second embodiment, maintenance execution timing can be changed according to user's instructions depending on the load of the print job. That is, the printer 101 includes a receiving unit (not illustrated) which receives instructions for making a maintenance operation be performed at arbitrary timing, whereby a maintenance operation set according to user's instructions ("a user maintenance operation") can be performed.

The receiving unit is constituted as a function unit of the operation panel 50 and the control unit 40 (see FIG. 2). That is, in the program operated by the control unit 40, instructions input from the operation panel 50 (instructions which makes the maintenance operation be performed at arbitrary timing) are received, and a user maintenance operation is performed under the control of the control unit 40. By performing the maintenance operation in advance, for example, the maintenance operation can be performed earlier before the start time of the periodic maintenance operation comes in a case in which, for example, the user wants to perform printing stably continuously for a certain period of time. In this case, the entire subsequent periodic maintenance operations are performed at earlier timings (intervals).

Figure 13:
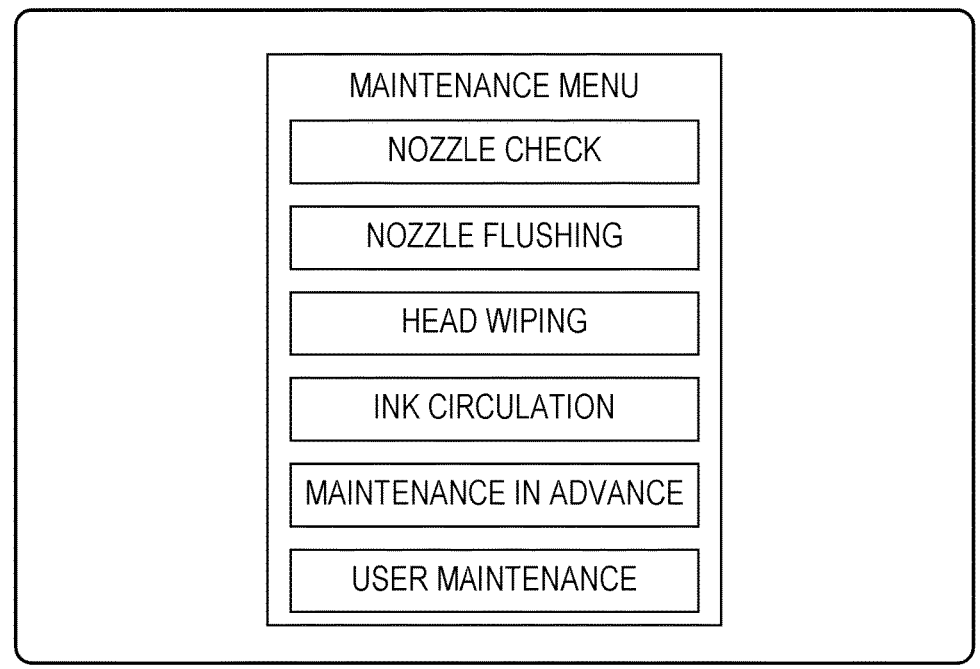
FIG. 13 is a display screen example when a maintenance menu is selected.

The screen illustrated in FIG. 13 is an exemplary maintenance menu screen when a "maintenance" button is selected on a main menu (not illustrated) displayed on the operation panel 50 when the printer 101 is started. In this example, nozzle check, nozzle flushing, head wiping, ink circulation, maintenance in advance, and user maintenance are displayed as the maintenance menu.

Figure 14:
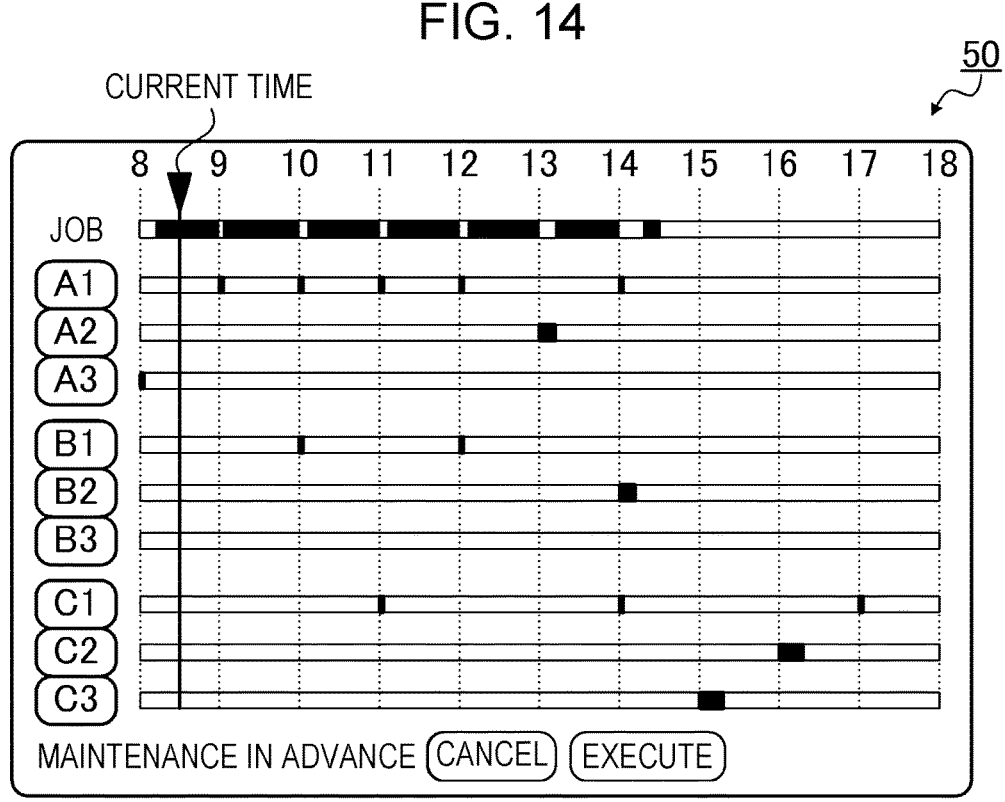
FIG. 14 is a display screen example when maintenance in advance is selected in a maintenance menu.

FIG. 14 is a display screen example when maintenance in advance is selected in the maintenance menu illustrated in FIG. 13. In FIG. 14, maintenance operations which can be performed as maintenances in advance (maintenances A1 to C3) are displayed with a time chart performed as a periodic maintenance operation. "A1" to "C3" on the left side of the screen are buttons for selecting a maintenance operation to be performed in advance. The user can designate the maintenance operation to be performed in advance and the start timing thereof by pressing a desired button among "A1" to "C3," pressing a point of timing to perform in advance on the lateral bar on the right side of the pressed button, and pressing an "execution" button. Pressing button here means touching on a touch panel, clicking a button at a position designated with a mouse, etc.

For example, if the maintenance B1 is designated to be performed in advance at current time (8:30), the maintenance B1 is performed promptly, and set to be subsequently performed every 2 hours at 10:30 and 12:30. If the maintenance B3 which is not planned to be performed within 10 hours is designated to be performed in advance at current time (8:30), the maintenance B3 is performed promptly, and set to be subsequently performed at predetermined intervals.

Figure 15:
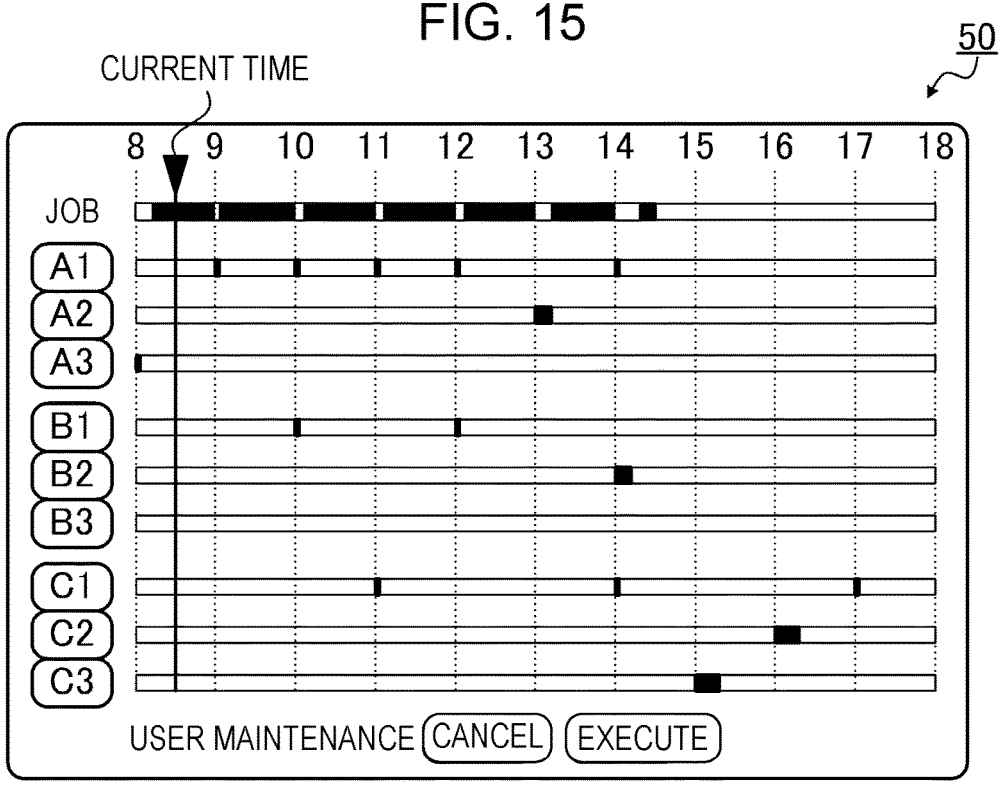
FIG. 15 is a display screen example when user maintenance is selected in the maintenance menu.

In addition to the predetermined periodic maintenance operation, a user maintenance operation that the user wants to perform independently can be added. FIG. 15 is a display screen example when the user maintenance is selected in the maintenance menu illustrated in FIG. 13. In FIG. 15, maintenance operations which can be additionally performed (maintenances A1 to C3) are displayed with a time chart (see FIG. 12) based on which the periodic maintenance operations are performed. "A1" to "C3" on the left side of the screen are buttons for selecting a maintenance operation to be performed additionally. The user can designate the maintenance operation to be performed additionally and the start timing thereof by pressing a desired button among "A1" to "C3," pressing a point of timing to perform additionally on the lateral bar on the right side of the pressed button, and pressing an "execution" button. Content set for the user maintenance operation is displayed in colors different from those of the periodic maintenance operation on the lateral bars. This display is reflected on the time chart illustrated in FIG. 12.

Figure 16:
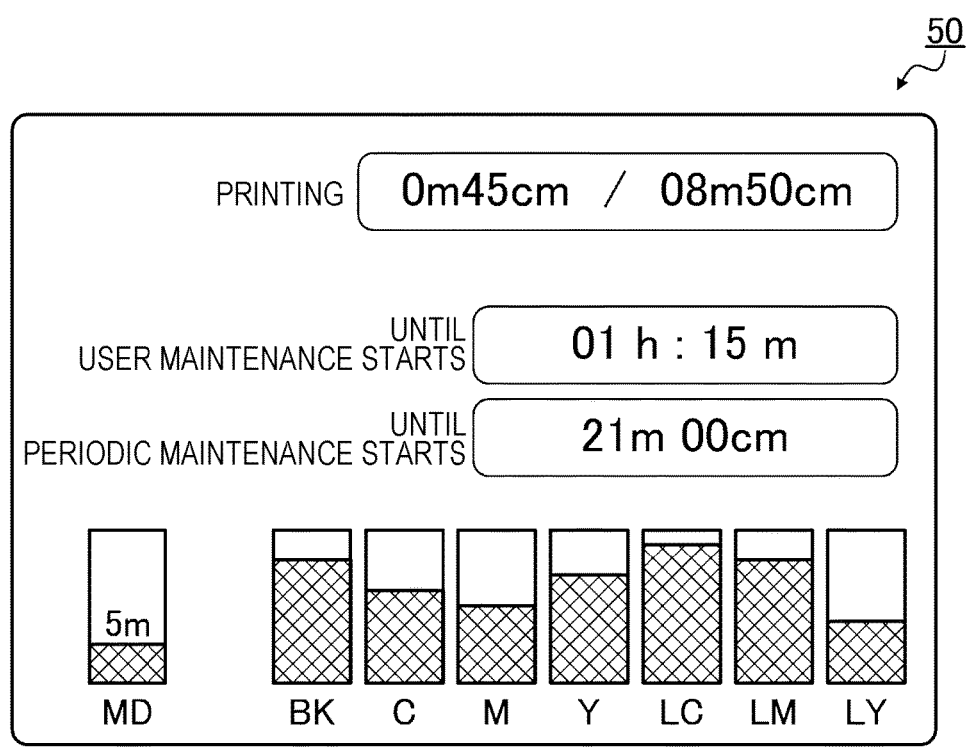
FIG. 16 is a display screen example of the operation panel on which maintenance timing information is displayed when user maintenance is added.

FIG. 16 is a display screen example of the operation panel 50 on which the maintenance timing information is displayed when the user maintenance is added. In the example illustrated in FIG. 16, time to start the user maintenance operation is displayed on the upper part of the center of the screen, and an amount of printing of the rolled paper 1 until the periodic maintenance operation is performed is displayed on the lower part of the center of the screen. Thus, in a case in which, for example, the periodic maintenance operation is set at intervals about the amount of printing of the printing medium (the rolled paper 1) and the user maintenance operation is set at execution timing, information in unit of each setup is displayed.

In a case where the user maintenance operation is added, there is a possibility that maintenance becomes excessive because of the previously set maintenance operation. For example, when the user added execution frequency, the added frequency may be the same as that of the previously set maintenance operation. Specifically, a periodic maintenance operation is planned immediately after a user maintenance operation. In the present embodiment, no excessive maintenance operation is performed in such a case. Specifically, the control unit 40 checks whether plural maintenance operations are planned in a predetermined period. If plural maintenance operations are planned, the control unit 40 compares maintenance intensity among the plural maintenance operation, and controls so that a maintenance operation with the highest intensity is performed at the earliest planned timing in the compared predetermined period, and that the rest of the maintenance operations are not performed.

Figure 17:
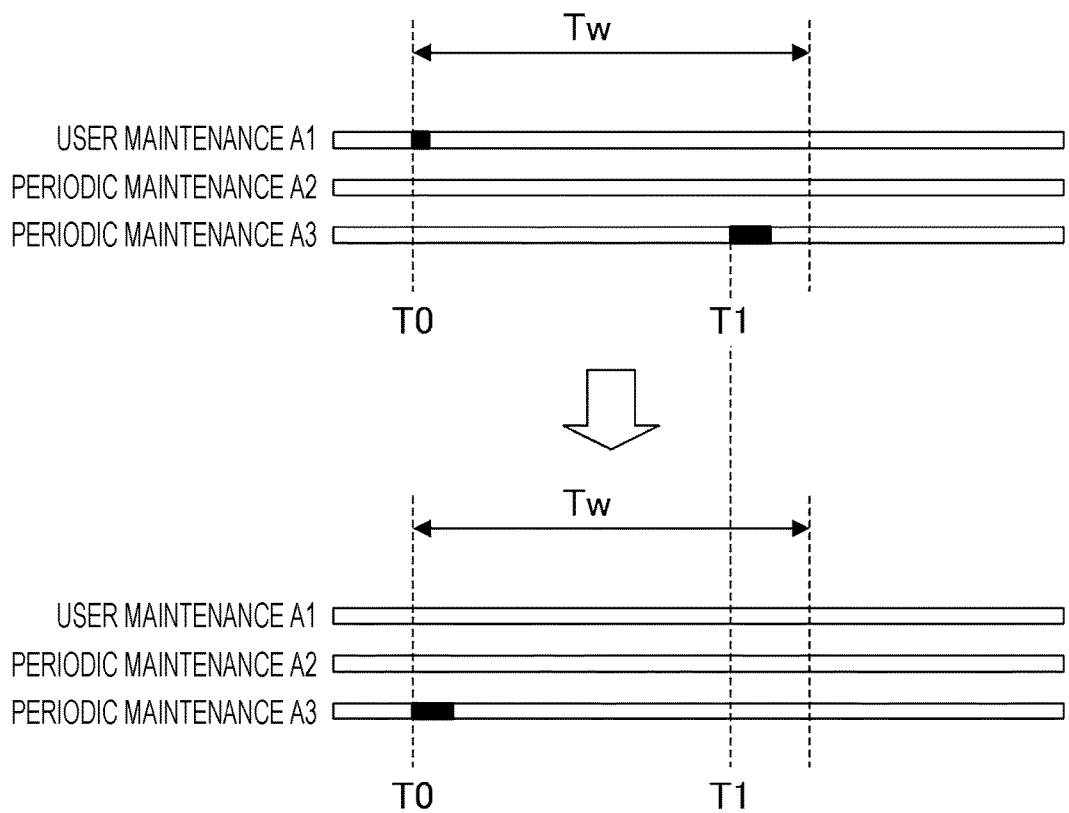
FIG. 17 is a conceptual diagram illustrating control when plural maintenance operations are planned in a predetermined period.

FIG. 17 is a conceptual diagram illustrating control of the control unit 40 when plural maintenance operations are planned in a predetermined period. For example, in a case where the maintenance operations are planned as illustrated in the upper diagram of FIG. 17, i.e., the user maintenance A1 is added at time T0, if the periodic maintenance A3 of which maintenance intensity is higher than that of the user maintenance A1 is already planned at time T1 in a predetermined period Tw from the time T0, the control unit 40 sets as illustrated in the lower diagram of FIG. 17. That is, at the time T0 at which the user was to perform the user maintenance A1, the control unit 40 determines to perform the periodic maintenance A3 with higher maintenance intensity in comparison with the user maintenance A1, and cancels execution of the designated user maintenance A1 and the periodic maintenance A3 at time T1 which is planned in advance.

It is desirable that the predetermined period Tw in which plural maintenance operations are corrected to be performed collectively is determined properly in advance in consideration of effects of the maintenance operation and time which the maintenance operation takes.

As described above, according to the recording apparatus (the printer 101) of the present embodiment, the following effects can be obtained. Since the printer 101 includes the receiving unit which receives an instruction which makes the maintenance operation be performed at arbitrary timing, in planning of a printing operation (plan setup of a printing job), the user can make a maintenance operation be performed at more proper timing.

Since the user maintenance operation performed at arbitrary timing as the maintenance operation can be planned in addition to a periodic maintenance operation performed at predetermined timing, in planning of a printing operation (plan setup of a printing job), the user can make a desired maintenance operation be additionally performed at proper timing.

The control unit 40 compares the maintenance intensity among the plural maintenance operations planned in a predetermined period, controls so that a maintenance operation with the highest intensity is performed at the earliest planned timing, and that the rest of the maintenance operations are not performed. Therefore, efficient maintenance can be performed with respect to the printing unit 10. That is, in planning of the printing operation (plan setup of the print job), a desired maintenance operation can be additionally performed at proper timing and, efficient maintenance with shorter downtime can be performed without performing excessive maintenance operations.

Third Embodiment

Figure 18:
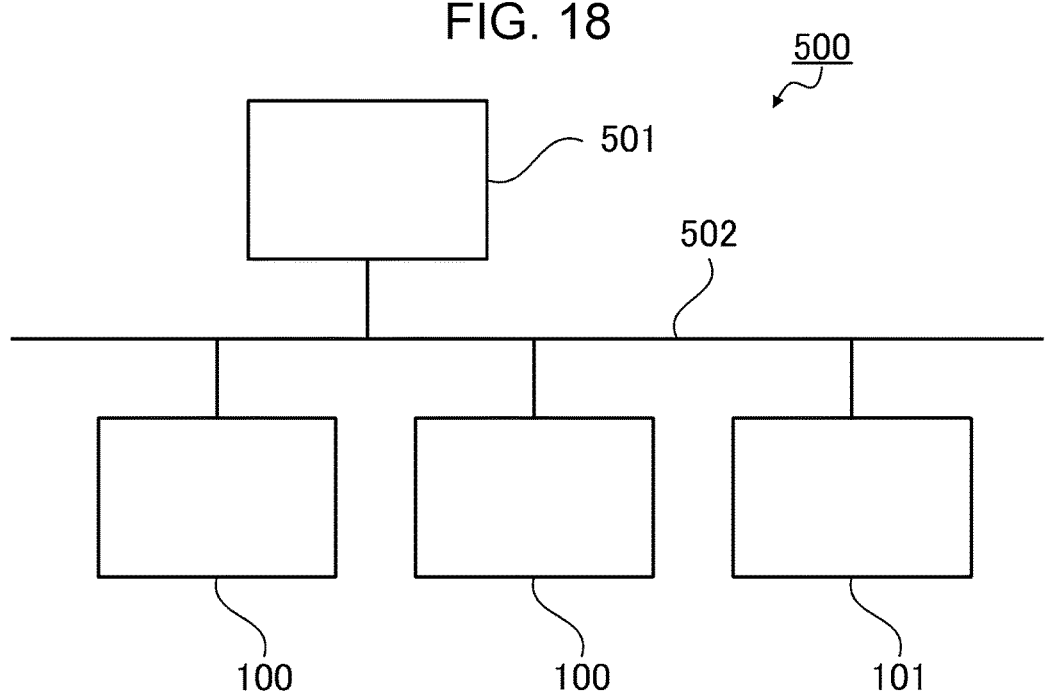
FIG. 18 is a block diagram of a configuration of a print system as a recording system according to a third embodiment.

Next, a "recording system" according to a third embodiment will be described. In the description, the same constituent parts as those of the above embodiments are denoted by the same reference numerals and repeated description is omitted. FIG. 18 is a block diagram of a configuration of a print system 500 as the "recording system" according to the third embodiment. Although the function in the single recording apparatus (the printer 100 or the printer 101) is described in the first and the second embodiments, an example of a recording system (a print system) provided with a server capable of performing operation management of plural recording apparatuses (the printer 100 or the printer 101) which are connected by a network will be described in the present embodiment.

The print system 500 includes the printer 100 or the printer 101, and a server 501 as an "information processing apparatus" capable of transmitting and receiving information" to and from the printer 100 or the printer 101. The control unit 40 notifies maintenance timing information by transmitting the maintenance timing information to the server 501. The server 501 is connected with the printer 100 or the printer 101 by a communication network 502 so as to transmit or receive information. The communication network 502 is constituted by a Local area network (e.g., a personal handy phone system (PHS) network, a wireless local area network (LAN)), and a public communication network (e.g., telephone network and the Internet) etc.

The print system 500 is useful in a case where plural recording (printing) apparatuses (the printer 100 and the printer 101) are collectively managed at one place etc. Since a control unit 40 provided in the printer 100 and the printer 101 notifies each maintenance timing information by transmitting the maintenance timing information to the server 501, the user can know the timing at which the maintenance operation of the recording (printing) apparatus (the printer 100 and the printer 101) connected to the communication network 502 is to be performed in advance by viewing the server 501. Therefore, operation management of the printer 100 or the printer 101 can be performed more properly.

This application claims priority under 35 U.S.C. § 119 to Japanese Patent Application No. 2016-040780, filed Mar. 3 2016. The entire disclosure of Japanese Patent Application No. 2016-040780 is hereby incorporated herein by reference.

What is claimed is:

1. A recording apparatus, comprising:
   a recording unit configured to record on a recording medium; and
   a control unit configured to control a maintenance operation of the recording unit,
   wherein the control unit is configured to provide a notification about maintenance timing information about timing at which the maintenance operation is to be performed, and
   wherein the maintenance timing information is a time chart based on which the maintenance operation is performed.

2. The recording apparatus according to claim 1, wherein the control unit is configured to provide the notification about the maintenance timing information by transmitting an email.

3. A recording system, comprising:
   the recording apparatus according to claim 2, and
   an information processing apparatus configured to transmit and receive information to and from the recording apparatus,
   wherein the control unit is configured to provide the notification about the maintenance timing information by transmitting the maintenance timing information to the information processing apparatus.

4. The recording apparatus according to claim 1, further comprising a display unit, wherein the control unit is configured to provide the notification about the maintenance timing information by displaying on the display unit.

5. A recording system, comprising:
   the recording apparatus according to claim 4, and
   an information processing apparatus that can configured to transmit and receive information to and from the recording apparatus,
   wherein the control unit is configured to provide the notification about the maintenance timing information by transmitting the maintenance timing information to the information processing apparatus.

6. The recording apparatus according to claim 1, further comprising a receiving unit configured to receive an instruction which makes the maintenance operation be performed at an arbitrary timing.

7. A recording system, comprising:
   the recording apparatus according to claim 6, and
   an information processing apparatus configured to transmit and receive information to and from the recording apparatus,
   wherein the control unit is configured to provide the notification about the maintenance timing information by transmitting the maintenance timing information to the information processing apparatus.

8. A recording system, comprising:
   the recording apparatus according to claim 1, and
   an information processing apparatus configured to transmit and receive information to and from the recording apparatus,
   wherein the control unit is configured to provide the notification about the maintenance timing information by transmitting the maintenance timing information to the information processing apparatus.

9. A recording apparatus, comprising:
   a recording unit configured to record on a recording medium; and
   a control unit configured to control a maintenance operation of the recording unit,
   wherein:
      the control unit is configured such that a user maintenance operation performed at arbitrary timing as the maintenance operation can be planned in addition to a periodic maintenance operation performed at predetermined timing,
      the maintenance operation has plural levels of maintenance intensity, and
      the control unit is configured such that when plural maintenance operations are planned to be performed in a predetermined period, the control unit compares maintenance intensity among the plural maintenance operations, and controls so that a maintenance operation with the highest intensity is performed at the earliest planned timing, and that the rest of the maintenance operations are not performed.

10. A recording system, comprising:
    the recording apparatus according to claim 9, and
    an information processing apparatus configured to transmit and receive information to and from the recording apparatus,
    wherein the control unit is configured to provide the notification about the maintenance timing information by transmitting the maintenance timing information to the information processing apparatus.

11. A maintenance method for a recording apparatus, comprising:
    performing a maintenance operation of a recording unit that records on a recording medium; and
    providing a notification about maintenance timing information about timing at which the maintenance operation is to be performed, wherein the maintenance information is a time chart.

* * * * *